United States Patent
Jobson et al.

(10) Patent No.: US 8,065,870 B2
(45) Date of Patent: Nov. 29, 2011

(54) DEVICE AND METHOD FOR REDUCTION OF A GAS COMPONENT IN AN EXHAUST GAS FLOW OF A COMBUSTION ENGINE

(75) Inventors: Edward Jobson, Romelanda (SE); Lennart Cider, Mölndal (SE); Göran Wirmark, Göteborg (SE)

(73) Assignee: Volvo Technology Corporation, Gothenburg (SE)

( * ) Notice: Subject to any disclaimer, the term of this patent is extended or adjusted under 35 U.S.C. 154(b) by 1017 days.

(21) Appl. No.: 10/065,624

(22) Filed: Nov. 4, 2002

(65) Prior Publication Data
US 2003/0086850 A1 May 8, 2003

Related U.S. Application Data

(63) Continuation of application No. PCT/SE01/00934, filed on Apr. 30, 2001, now abandoned.

(30) Foreign Application Priority Data

May 2, 2000 (SE) ...................................... 0001587

(51) Int. Cl.
*F01N 3/00* (2006.01)
(52) U.S. Cl. ............... 60/295; 60/274; 60/278; 60/280; 60/286; 95/11; 95/273
(58) Field of Classification Search ............ 60/274, 60/276, 278, 279, 280, 299, 286, 295, 303, 60/289; 123/568.11, 568.15; 95/8, 11, 141, 95/143, 273
See application file for complete search history.

(56) References Cited

U.S. PATENT DOCUMENTS

| | | | | |
|---|---|---|---|---|
| 3,393,668 A | * | 7/1968 | Milgram | 60/278 |
| 3,645,098 A | * | 2/1972 | Templin et al. | 60/288 |
| 3,831,377 A | * | 8/1974 | Morin | 60/274 |
| 3,846,980 A | * | 11/1974 | DePalma | 60/279 |

(Continued)

FOREIGN PATENT DOCUMENTS
DE 4331508 C1 10/1994
(Continued)

OTHER PUBLICATIONS

Tavolaro, Adalgisa and Driolo, Enrico, *Zeolite Membranes*, Advanced Materials 1999, 11, No. 12, pp. 975-996, © Wiley-VCH Verlag GmbH, D-69469 Weinheim, 1999.

(Continued)

*Primary Examiner* — Tu Nguyen
(74) *Attorney, Agent, or Firm* — Novak Druce + Quigg LLP

(57) ABSTRACT

Method and device for reduction of a gas component in an exhaust gas flow of a combustion engine (1) that is adapted for operation by a lean air/fuel mixture. An exhaust pipe (21) is included for transport of the exhaust gas flow from the engine (1). A separation unit (22) is also included that is arranged along the exhaust pipe (21), which separation unit (22) has a wall structure (32) of a material which provides separation of the gas component from the exhaust gas flow by means of a selective passage of the gas component before other gas components in the exhaust gas flow. The method provides for a reduction and a separation unit that is intended to be utilized during such a reduction. An improved reduction of in particular $NO_x$ compounds from a so-called "lean-burn" engine is also provided.

14 Claims, 6 Drawing Sheets

U.S. PATENT DOCUMENTS

| | | | | |
|---|---|---|---|---|
| 3,903,694 A | * | 9/1975 | Aine | 60/274 |
| 4,230,463 A | * | 10/1980 | Henis et al. | 95/47 |
| 5,071,451 A | * | 12/1991 | Wijmans | 95/47 |
| 5,375,414 A | * | 12/1994 | Adamczyk et al. | 60/274 |
| 5,661,973 A | * | 9/1997 | Casey | 60/279 |
| 5,953,907 A | * | 9/1999 | Kato et al. | 60/274 |
| 6,122,908 A | * | 9/2000 | Wirmark | 60/274 |
| 6,915,629 B2 | * | 7/2005 | Szymkowicz | 60/289 |
| 6,964,158 B2 | * | 11/2005 | Abdul-Khalek | 60/278 |

FOREIGN PATENT DOCUMENTS

| | | |
|---|---|---|
| DE | 4342297 A1 | 6/1995 |
| DE | 19654977 A1 | 6/1998 |
| DE | 19713633 C1 | 1/1999 |
| DE | 19837505 C1 | 12/1999 |
| GB | 2345866 A | 7/2000 |
| JP | 2000279773 A | 10/2000 |
| JP | 2005-049024 | 2/2005 |
| WO | WO 9425642 A1 | 11/1994 |

OTHER PUBLICATIONS

Office Action issued in JP App. No. 2001-579952; May 31, 2010.

* cited by examiner

US 8,065,870 B2

DEVICE AND METHOD FOR REDUCTION OF A GAS COMPONENT IN AN EXHAUST GAS FLOW OF A COMBUSTION ENGINE

CROSS REFERENCE TO RELATED APPLICATIONS

The present application is a continuation of International Application No. PCT/SE01/00934, filed Apr. 30, 2001 and published in English pursuant to PCT Article 21(2), now abandoned, and which claims priority to Swedish Application No. 0001 587-5 filed May 2, 2000. Both applications are expressly incorporated herein by reference in their entireties.

BACKGROUND OF INVENTION

1. Technical Field

The present invention relates to a device for reducing at least one gas component in an exhaust gas flow of a combustion engine. The engine is adapted for operation on a lean air/fuel mixture and includes an exhaust pipe for transport of the exhaust gas flow from the engine. The invention is particularly intended for reduction of harmful emissions from the exhaust gas flow; and more particularly, via a method and arrangement incorporating a separation unit for this purpose.

2. Background of the Invention

In the field of vehicles that are operated by combustion engines, there is a general demand for low emissions of harmful substances in the exhaust gases from the engine. These substances are primarily constituted by pollutants in the form of oxides of nitrogen ($NO_x$), hydrocarbon compounds (HC), and carbon monoxide (CO). Regards conventional petrol engines, the exhaust gases are typically purified by means of an exhaust catalyst that forms part of the exhaust system and through which the exhaust gases are guided. In a so-called three-way catalyst, the major part of the above-mentioned harmful compounds is eliminated by means of conventional catalytic reactions. In order to optimize the function of the catalyst so that it provides an optimal degree of purification for $NO_x$ HC, and CO, the engine is in most operating conditions operated by a stoichiometric air/fuel mixture; that is, a mixture where lambda=1.

Furthermore, in today's vehicular environment, there is a general demand for reducing the fuel consumption of the engine to the highest possible degree. To this end, during the last few years, engines with new types of combustion chambers in the engine's cylinders have been developed; in particular in ways that enable the engine to operate by increasingly lean fuel mixtures, i.e. where lambda=1. In such an engine, which normally is called a "lean-burn" engine, or alternatively a "Dl engine" direct-injected Otto cycle engine), the respective combustion chamber in the engine is arranged in such manner that the supplied fuel to a great degree can be concentrated at the respective ignition plug. This mode of operation is generally termed "stratified" operation and during continuous driving at a low or a medium-high torque and engine speed of the engine, it can operate on a very lean air/fuel mixture; more precisely, up to approximately lambda=3. In this manner, a substantial savings in fuel consumption is obtained using this type of engine. The engine can also be operated in an additional, "homogeneous" mode of operation with an essentially stoichiometric mixture (lambda=1) or a comparatively rich mixture (lambda=1). This latter mode of operation normally prevails during driving situations with comparatively high torques and speeds of the engine.

During stratified operation, a lean exhaust gas mixture will flow through the three-way catalyst. This corresponds to an exhaust gas mixture with a surplus of oxygen in relation to what is the case during lambda=1. This results in the three-way catalyst not being properly utilized for reduction of the $NO_x$ compounds in the exhaust gases due to the fact that it is constructed for an optimal purification capacity during stoichiometric mixture. In such cases, there becomes a demand for additional devices and methods for the reduction of $NO_x$ compounds. This demand also arises in other types of engines that are operated by a surplus of oxygen and where $NO_x$ compounds are generated during operation, which, for example, is the case with diesel engines.

In order to provide a reduction of $NO_x$ compounds from a "lean-burn engine" the engine can be provided with a nitrogen oxide adsorbent (also-called $NO_x$ adsorbent, or "$NO_x$ trap" for absorption of $NO_x$ compounds in the exhaust gases from a combustion engine. The $NO_x$ adsorbent can be utilized as a complement to a conventional three-way catalyst either as a separate unit upstream of the three-way catalyst or as an integral part of the three-way catalyst; that is, together with the catalytic material of the three-way catalyst.

The $NO_x$ adsorbent is constructed in such manner that it takes up (adsorbs) $NO_x$ compounds from the exhaust gases if the engine is operated by a lean air/fuel mixture and gives off (desorbs) the $NO_x$ compounds if the engine is operated by a rich air/fuel mixture during a certain time period. Furthermore, the $NO_x$ adsorbent has the property of being able to adsorb $NO_x$ compounds only up to a certain limit; that is, it is eventually "filled" and thus reaches a limit for the adsorption. In this situation, the $NO_x$ adsorbent must be regenerated; that is to say, it must be influenced or caused to desorb, and thus release the accumulated $NO_x$ compounds. If a conventional three-way catalyst is provided downstream of a $NO_x$ adsorbent, or if alternatively a three-way catalyst is formed as an integral part of at $NO_x$ adsorbent, provided that the latter has reached its ignition temperature.

A $NO_x$ adsorbent can typically be regenerated by means of the fact that the exhaust gas mixture that flows through the $NO_x$ adsorbent is made comparatively rich during certain time periods usually extending over approximately a few seconds. In practice, this is achieved by the fact that the engine, during this time period, is operated in the above-mentioned homogeneous mode of operation, wherein the engine is operated on a comparatively rich air/fuel mixture. By means of this "rich pulse" a surplus of CO and $H_2$ molecules is generated that functions as a reduction agent which in turn reacts with $NO_x$ compounds according to the following:

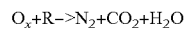

$$O_x + R \rightarrow N_2 + CO_2 + H_2O$$

where R schematically indicates the relevant reduction agent. In this manner, a large part of the $NO_x$ compounds in the exhaust gas flow can be eliminated by means of transformation into molecular nitrogen, carbon dioxide and water. Then, the engine once again can be reset to lean operation, by means of which the $NO_x$ adsorbent absorbs $NO_x$ compounds during a certain time period that lasts until a new regeneration becomes necessary.

Thus, according to what has been described above, the $NO_x$ compounds are reduced by means of a reduction agent which is taken from the engine's own fuel; that is, it is generated in the engine during the short time period during which the engine is operated during rich conditions. Furthermore, a control unit is utilized with a suitable strategy for switching the combustion engine between homogeneous and stratified operation depending on whether a $NO_x$ regeneration is necessary and depending on the engine's mode of operation in other respects such as depending on the relevant degree of throttle application and the engine speed.

Although the above-mentioned course of events for regeneration of a $NO_x$ adsorbent in principle functions satisfactorily, it suffers from certain drawbacks. For example, it can be noted that it is necessary to operate the engine by a rich exhaust gas mixture for regeneration of the $NO_x$ adsorbent, and this requires an accurate control of the engine's mode of operation, particularly for switching between rich and lean operation, respectively. Moreover, the regeneration results in a surplus of fuel being supplied to the engine during the rich pulse. This in turn causes the engine's fuel consumption to be influenced in a negative way.

An additional drawback associated with the regeneration of a $NO_x$ adsorbent by means of supply of a reduction agent is that a large part of the reduction agent reacts with the oxygen molecules that are present in the exhaust gas flow. Thus, the HC, $H_2$ or CO molecules in the exhaust gas flow that could react with $NO_x$ compounds in the exhaust gases and form harmless $N_2$ instead, to a great extent, react with oxygen molecules in the exhaust gases and this impairs the efficiency of the process.

Another known manner of reducing $NO_x$ compounds is to supply a reduction agent in the form of ammonia/urea (so-called SCR technique) to the relevant gas flow. A drawback of this method, however, is that it requires special arrangements for storage and supply of ammonia/urea, and that a $NO_x$ reduction by means of this technique only is allowed within a certain temperature interval; more precisely, approximately 300-5000°.

Still another known manner for reducing $NO_x$ compounds in engine exhaust gases is to utilize a so-called EGR system (Exhaust Gas Recirculation), wherein a certain amount of the exhaust gases from the engine is returned to the inlet of the engine.

Yet another known manner of reducing $NO_x$ compounds in engine exhaust gases is to utilize zeolite structures with pores of two different sizes (so-called "dual pore size" technique). In this case, $NO_x$ molecules, for example, in a gas flow which passes the zeolite structure will be transformed into $NO_2$ molecules in the pores of the smaller size whereupon the $NO_2$ molecules react with a reduction agent such as an HC compound in the pores of the larger size. In this case, by means of the last-mentioned reaction, $N_2$, $CO_2$ and $H_2O$ are formed.

Other HC-based systems can also be utilized for $NO_x$ reduction such as in a system that is based on an oxide of aluminum ($Al_2O_3$) to which silver atoms have been supplied. In such a structure, an HC compound can be supplied at the same time as a gas flow containing $NO_x$ compounds is allowed to pass the structure. This results in a decrease of the $NO_x$ compounds in the gas flow.

SUMMARY OF INVENTION

One object of the present invention is to provide an improved reduction of a gas component, in particular a $NO_x$ compound, in an exhaust gas flow of a combustion engine by means of which the above-mentioned problems and drawbacks are eliminated. This object is exemplarily accomplished by means of a means or device in the form of a separation unit.

According to a first embodiment, the invention relates to a device for reduction of a gas component in an exhaust gas flow of a combustion engine which is adapted for operation by a lean air/fuel mixture, comprising an exhaust pipe for transport of said exhaust gas flow from the engine. The device comprises a separation unit which is arranged along the exhaust pipe, which separation unit comprises a wall structure of a material which provides separation of said gas component from said exhaust gas flow by means of a selective passage of said gas component from the exhaust gas flow before other gas components in the exhaust gas flow.

According to the first embodiment of the invention, a reduction agent is preferably supplied for catalytic reduction of the relevant gas component such as a $NO_x$ compound. The wall structure provides a selective passage of the relevant gas component from the exhaust gas flow before other gas components in the exhaust gas flow. In this case, the gas component reacts in a catalytic manner with the reduction agent after (or during) its passage through the wall structure. In this manner, several advantages are attained. Primarily, it can be noted that it allows the car's own fuel to be used as reduction agent at the same time as the reduction of $NO_x$ compounds can take place continuously during lean operation of the engine in question. In connection with the above-mentioned wall structure, a catalytic reaction is provided for the above-mentioned reduction. This implies that the reduction agent will react primarily with $NO_x$ molecules in the exhaust gas flow (instead of being wasted by reacting with oxygen molecules). In this manner, the reaction with oxygen is suppressed, which is an advantage.

One particular advantage of the embodiment relates to the fact that reduction agent which has not reacted with any gas component in the exhaust gas flow can be guided back into the engine. To this end, the separation unit comprises an outlet that is connected with the inlet of the engine. This affects the fuel consumption i.e. the consumption of reduction agent for the reduction of $NO_x$ compounds in a positive way.

In another aspect, a certain amount of $NO_x$ compounds that pass through the wall structure without reacting with the reduction agent can also be returned to the intake side of the engine.

According to a second embodiment of the invention, no reduction agent is supplied to the separation unit. Instead, the invention is in this case utilized for return of the gas component to the inlet of the engine after separation in the separation unit. In this manner, the returned gas component is prevented from being released out into the surrounding atmosphere.

According to a third embodiment, the invention relates to a device for reduction of a first gas component in an exhaust gas flow of a combustion engine that is adapted for operation by a lean air/fuel mixture. The device or arrangement includes an exhaust pipe for transport of said exhaust gas flow from the engine. The device also has a separation unit that is arranged along the exhaust pipe. The separation unit includes a wall structure of a material that provides separation of a second gas component from the exhaust gas flow by means of a selective passage of said second gas component before other gas components in the exhaust gas flow. Further, the separation unit includes an outlet that is connected with the inlet of the engine, via a conduit, for return of the second gas component to the inlet after separation from the exhaust gas flow.

According to the third embodiment of the invention, a component in the form of water can be separated from the exhaust gas flow and be returned to the intake side of the engine. This contributes to a decrease of the amount of $NO_x$ compounds which are formed in the engine. In this manner, the invention provides a "selective EGR function" with return of water that is separated from the exhaust gases in the wall structure. One advantage related to this arrangement is that no extra water needs to be supplied to the engine for decrease of $NO_x$ compounds, but instead the amount of water that is present in the exhaust gas flow out from the engine is utilized.

According to a fourth embodiment of the invention, a utilization in connection with a combustion engine of the type which includes a turbo-aggregate is contemplated. Because water (which has been separated from the exhaust gases by means of the above-mentioned separation unit) is returned to a point upstream of a compressor forming part of the turbo-aggregate and the water is cooled by means of an intercooler, the discharge of $NO_x$ compounds from the engine can be additionally reduced.

BRIEF DESCRIPTION OF DRAWINGS

The invention will be further described in the following with reference to a preferred embodiment and to the annexed drawings, in which.

DETAILED DESCRIPTION

Figure 1:
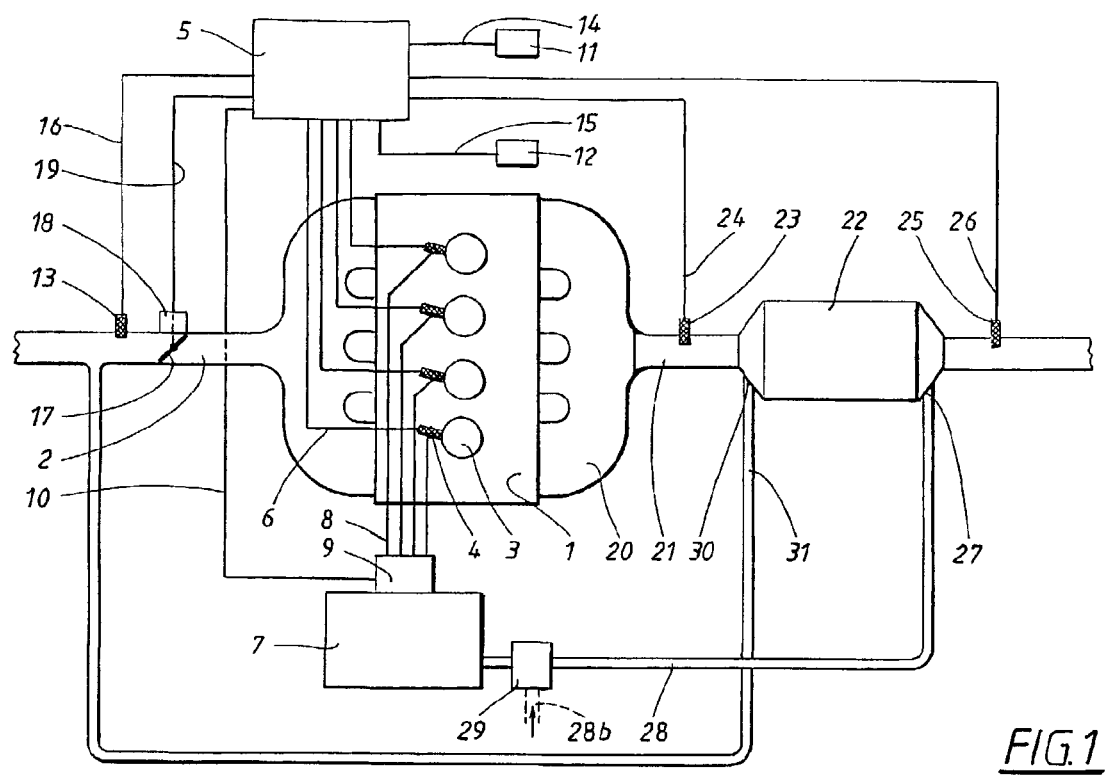
FIG. 1 is a principal diagram the shows an arrangement in which the present invention can be utilized, according to a first embodiment.

FIG. 1 shows a schematic view of an exemplary arrangement according to the present invention. According to a preferred embodiment, the invention is arranged in connection with a combustion engine 1 of the "lean-burn" type (also called Dl engine), i.e. an engine of the direct-injected Otto cycle engine type, where the injection of fuel to the engine 1 is adapted for at least two modes of operation with different air and fuel supply to the engine 1 and varying periods of time for injection of fuel and for the ignition of the air/fuel mixture. More precisely, the engine 1 is preferably adapted to be able to be set in a "stratified" mode of operation in which the supplied fuel is concentrated in the respective combustion chamber of the engine so that the engine during certain predetermined operating cases can be operated by a very lean air/fuel mixture, or approximately lambda=3. The stratified mode of operation is based on the fact that fuel is injected into the engine 1 so that it is mixed partially (i.e. non-homogeneously) with air, wherein a small "cloud" of mixed fuel and air is formed. Around this partial mixture there is essentially clean air. In this manner, ignition of a very lean mixture, approximately lambda=3, can occur. Compared with the case where lambda=1, three times as much air is in this case supplied with the same amount of fuel. By means of such an engine, considerable fuel savings are provided compared with engines which are operated by a stoichiometric mixture, i.e. where lambda=1. Furthermore, the engine 1 can preferably be set in a "homogeneous" mode of operation during certain operating cases at comparatively high torques and engine speeds of the engine 1 during which a stoichiometric or a comparatively rich mixture is supplied to the engine 1. In this case, this mixture in contrast to what is the case during the stratified mode of operation is essentially uniformly distributed in the combustion chamber.

The invention is not limited to utilizations in connection with only "lean-burn" engines, but it may also be applied in other types of engines, for example diesel engines and other types of engines which can be operated by a surplus of oxygen in relation to the stoichiometric mixture and where there is a demand for reduction of $NO_x$ compounds. In the following, however, the invention will be described with reference to a "lean-burn" engine the is intended to be driven by petrol.

The engine 1 is in a conventional manner fed with inflowing air via an air inlet 2. Furthermore, the engine 1 is provided with a number of (e.g. four) cylinders 3 and a corresponding number of fuel injectors 4. The respective injector 4 is connected to a central control unit 5 via an electrical connection 6. The control unit 5 is preferably computer-based and is adapted to control the fuel supply to each injector 4 with fuel from a fuel tank 7 in a known manner so that an air/fuel mixture that is adapted in any given moment is fed to the engine 1. The fuel is fed from the fuel tank 7 via conduits 8 to the respective injector 4. Moreover, for feeding of the fuel to the respective injector 4, a fuel pump 9 is provided in connection with the fuel tank 7. The fuel pump 9 is controllable by means of the control unit 5, which to this end is connected to the fuel pump 9 via an additional electrical connection 10. The engine 1, according to this embodiment, is formed in accordance with the "multi-point" injection type in which the correct amount of fuel to the engine 1 in a known manner can be supplied individually to the respective injector 4 by means of control by the control unit 5.

The engine 1 that is shown in the drawing is of a four-cylinder type. However, it shall be noted that FIG. 1 only shows the principal design of an engine system according to the invention, which can be utilized in engines having various numbers of cylinders and various cylinder configurations.

During operation of the engine 1, the control unit 5 is generally adapted in order to control the air/fuel mixture to the engine 1 so that it in every given moment is adjusted to the prevailing mode of operation. The control of the engine 1 takes place in an essentially known manner depending on various parameters that reflect the mode of operation of the engine 1 and the vehicle in question. For example, the control of the engine can take place depending on the relevant degree of throttle application, the engine speed, the amount of injected air to the engine and the oxygen concentration in the exhaust gases. To this end, the engine 1 is provided with, for example, a position indicator 11 for the vehicle's accelerator pedal (not shown), an engine speed indicator 12 for detection of the engine speed of the engine 1 and an air flow meter 13 for detection of the amount of supplied air to the engine 1, all of which are connected to the control unit 5 via corresponding electrical connections 14, 15 and 16, respectively. Furthermore, the system includes a gas throttle 17, which preferably is electrically controllable and, for this reason, is provided with a controllable shifting motor 18, by means of which the gas throttle 17 can be set in a certain desired position so that a suitable amount of air is fed into the engine 1 depending on the relevant mode of operation. Thus, the shifting motor 18 is connected to the control unit 5 via an additional connection 19.

During operation of the engine 1, its exhaust gases are guided out from the cylinders 3 via a branch pipe 20 and further on to an exhaust pipe 21 that is connected to the branch pipe 20. A special separation unit 22 is provided further downstream along the exhaust pipe 21. According to what will be described in detail below, the separation unit 22 is adapted to be utilized during reduction of $NO_x$ compounds in the exhaust gas flow that is guided from the engine 1, through the exhaust pipe 21 and the separation unit 22, and then further out into the atmosphere.

Furthermore, the arrangement according to the invention comprises a sensor 23 for detection of the oxygen concentration in the exhaust gases. Preferably, the sensor 23 is of the linear lambda probe type (but may alternatively be constituted by a binary probe) and is connected to the control unit 5 via an electrical connection 24. Preferably, the sensor 23 is provided in the exhaust pipe 21, upstream of the separation unit 22. In a conventional manner, the sensor 23 is utilized for generation of a signal which corresponds to the oxygen concentration in the exhaust gases. The signal is fed to the control unit 5 via the connection 24 and is utilized for controlling the air/fuel mixture to the engine 1.

Moreover, according to this embodiment, a $NO_x$ sensor 25 is provided, for example, in the form of an indicator that is utilized to determine the concentration of $NO_x$ compounds in the exhaust gas flow. To this end, the $NO_x$ sensor 25 is provided in the exhaust pipe 21, downstream of the separation unit 22, and is connected to the control unit 5 via an additional electrical connection 26. According to what will be described in detail below, by means of a continuous detection of the concentration of $NO_x$ compounds in the exhaust gases, a possibility is provided to control the amount of reduction agent in the control unit 5; that is, a possibility to continuously control the degree of reduction of $NO_x$ compounds. Furthermore, by means of the $NO_x$ sensor 25, a possibility is provided to diagnose the function regarding the $NO_x$ reduction and to control the function of the parts forming part of the system. This will also be described in greater detail hereinbelow.

As an alternative to what is shown in FIG. 1, the $NO_x$ sensor can be provided upstream of the separation unit 22. Also in this case, it can be utilized for controlling the amount of reduction agent that is to be supplied to the inlet 27. According to an additional alternative, two $NO_x$ sensors can be utilized, which in this case are arranged in front of and after the separation unit 22. In this manner, an excellent opportunity is provided for determination of the degree of transformation in the separation unit 22 as well as for functional control of the separation unit 22.

The structure and the function of the invention will now be described in detail. During stratified operation of the engine 1, a lean exhaust gas mixture (i.e. lambda=1) is generated which flows through the exhaust pipe 21 and reaches the separation unit 22. This corresponds to a large surplus of oxygen in the exhaust gases, and according to what has been previously described, this results in that the $NO_x$ compounds that are generated by the engine 1 would not be able to be eliminated by means of a conventional three-way catalyst. Instead, for reduction of $NO_x$ compounds in the exhaust gases from the engine 1, the separation unit 22 according to the invention is provided with an inlet 27 through which a reduction agent can be fed into the separation unit 22. According to the embodiment, this reduction agent is supplied separately from the exhaust gas flow that is emitted from the engine 1. More precisely, the reduction agent is taken from the vehicle's own fuel and is in this case constituted by, for example, various HC compounds. To this end, the inlet 27 is connected with a conduit 28 for feeding of fuel from the fuel tank 7. Furthermore, along the conduit 28, a special transformation unit 29 is provided which is adapted for treatment of the fuel, which is fed via the conduit 28 into a form that is suitable as reduction agent in the separation unit 22. More precisely, the transformation unit 29 can include a vaporizing device for transformation of fuel from liquid form to gas form. This gaseous fuel is subsequently supplied to the separation unit 22 in the form of a reduction agent. Alternatively, the transformation unit 29 can have a reformer for catalytic reformation of fuel into a suitable reduction agent in the separation unit 22. Furthermore, the transformation unit can suitably have additional components; for example in the form of a pump for adjustment of the pressure of the reduction agent which is fed to the separation unit and a valve for control of the flow of reduction agent to the separation unit 22. In this case, such additional components are suitably controllable via connections to the above-mentioned control unit 5.

Due to the fact that the engine 1 according to the embodiment is a "lean-burn" engine, the fuel is constituted by petrol. The invention, however, is not limited to this type of fuel, but it can also be utilized in, for example, diesel engines. Furthermore, the reduction agent can be constituted by other substances as well, e.g. alcohols, methanol, hydrogen gas, ethanol or pure hydrocarbons (according to the formula $C_xH_y$). In such cases, the reduction agent is supplied to the separation unit 22 from a separate tank that is particularly intended for the reduction agent in question.

According to what will be described hereinafter, the invention is arranged in such a way that the reduction agent reacts with the exhaust gas flow in the separation unit, 22, wherein $NO_x$ compounds in the exhaust gas flow can be eliminated. The amount of reduction agent that has not reacted is guided back to the fuel tank 7 via an outlet 30 in the separation unit 22 and an additional conduit 31 that connects the separation unit 22 with the inlet 2 of the engine 1. In this manner, an advantage is attained by means of the invention in so far as any possible remaining and unutilized reduction agent is returned to the engine 1 instead of being lost. The reaction between the reduction agent and the exhaust gas flow in which $NO_x$ compounds are reduced is apparent in detail from FIG. 2, which is an enlarged and partly broken view of a section of the inside of the separation unit 22. The unit is provided with a number of inner walls 32 which are separated from each other and are arranged with such an extension that the exhaust gas flow is allowed to pass through the separation unit 22 and out into the atmosphere. Preferably, the walls 32 are arranged with an extension that is essentially in the longitudinal direction of the separation unit 22. The walls 32 define a number of separated, longitudinal ducts 33a, 33b. The ducts 33a, 33b are provided in such a way that the reduction agent in question is guided along every other duct 33b and that the exhaust gas flow is guided along ducts 33a that are arranged between the ducts 33b through which the reduction agent is guided. In this regard, the reduction agent and the exhaust gas flow are guided in essentially the opposite direction in relation to each other.

In order to additionally facilitate the transport of fuel from the tank 7 to the inlet 27 of the separation unit 22, a carrier gas can be supplied to the transformation unit 29, or alternatively directly to the conduit 28. Such a connection from the surrounding atmosphere to the transformation unit 29 is shown with broken lines and with the reference numeral 28b in FIG. 1. Alternatively, the connection can connect directly to the conduit 28 that leads to the separation unit 22. Due to the fact that the separation unit 22 according to the embodiment is connected to the inlet 2 of the engine 1 via the conduit 31, there is a pressure difference between the inlet 2 and the separation unit 22, which in turn contributes to a sufficient operating pressure which in an effective manner brings the carrier gas to the separation unit 22 together with the fuel.

According to an additional alternative of the invention, the outlet 30 can be excluded. In such a case, it is controlled that only the amount of reduction agent that is estimated to be consumed during the reaction with the $NO_x$ compounds is supplied to the separation unit 22.

Figure 2:
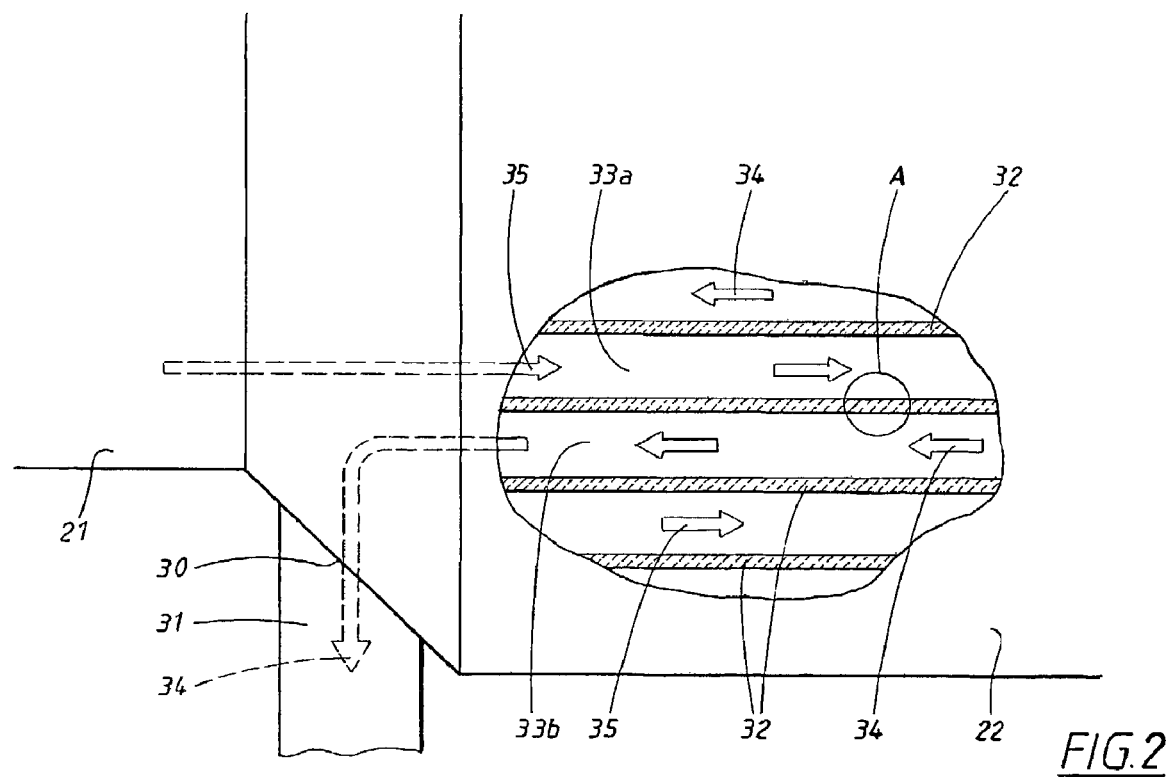
FIG. 2 is an enlarged detail view of a separation unit according to the invention.

Thus, according to what is indicated by means of arrows 34 in FIG. 2, the relevant reduction agent is guided along every other duct in the separation unit 22. In this case, as is indicated by means of additional arrows 35, the exhaust gases are guided from the engine 1 along the intermediate ducts. Thus, according to the invention, the exhaust gases and the reduction agent are guided into the separation unit 22 along separated ducts.

According to what is apparent from the drawings, the reduction agent is suitably guided into the separation unit 22, counter-current in relation to the exhaust gas flow. It should be appreciated, however, that the invention is not in this way limited. Alternatively, the reduction agent can be guided into the separation unit along essentially the same direction as the exhaust gases; that is, with the current, or crosswise in relation to the flowing direction of the exhaust gases. Preferably, the reduction agent is guided into the separation unit 22 in a counter-current manner, seeing that a minimum concentration of $NO_x$ compounds in this case is met by a maximum concentration of the reduction agent.

According to the preferred embodiment, the walls 32 are arranged as essentially planar and parallel plates with an extension in the longitudinal direction of the separation unit 22. However, the invention is not limited to such a design, but the walls may, for example, be defined by a number of concentric pipes, between which pipes intervals are defined which correspond to the above-mentioned ducts. An additional alternative is to design the separation unit in the form of an extruded monolith with honeycomb structure where the exhaust gas flow and the reduction agent are fed into every other duct. A fourth alternative is to design the separation unit as a disc which, when seen in a cross-sectional view, is folded essentially as an "S"

Independently of which alternative is selected for realizing this embodiment, it can be that it is based on the fact that exhaust gases and reduction agent are fed into the separation unit 22 along the ducts 33a, 33b, which are separated from each other and which are situated on both sides of a number of walls 32 which together constitute a wall structure. The walls 32 are designed in order to control the exhaust gas flow from the engine 1 in an optimal and correct manner as regards the flow, and so that the reduction agent and the exhaust gas flow, respectively, can be guided into one side each of the respective wall 32.

According to the invention, the walls 32 are constructed of a material which has a selective adsorption capacity as regards diffusion (i.e. penetration) into the walls 32 of various gas components which are guided along the respective duct 33a, 33b. Preferably, the walls 32 are constructed of a zeolite material of known type that includes a molecular structure that can be utilized in order to separate various gas components in e.g. a gas mixture depending on differences as regards molecular size and molecular form in these gas components. More precisely, zeolites include a crystal structure in which "pores" or "ducts" are formed that are of such dimensions that the above-mentioned selective function is provided.

According to the invention, a suitable zeolite material can be utilized in order to allow passage of $NO_x$ compounds in the exhaust gas flow through the respective wall 32, while passage of oxygen is considerably prevented. The zeolite material also allows passage of the reduction agent through the respective wall 32. According to the preferred embodiment, such zeolite material is utilized whose molecular structure has a duct diameter which is of such a size, approximately 5 angstrom (1 angstrom=$10^{-10}$ m), that oxides of nitrogen are allowed to pass with a comparatively high rate of diffusion while other gas components, for instance oxygen, are allowed to pass with a comparatively low rate of diffusion. One example of such a zeolite material is ZSM-5. Again, however, the invention is not limited to this material. Thus, according to the embodiment, a separation of molecules depending on the size is provided. The transport through the wall structure is maintained by means of a partial pressure difference, in which a carrier gas suitably can be utilized in order to transport the molecules that have passed through the wall structure.

Zeolites are merely one example of a material that can be utilized in order to separate molecules of various size and form in accordance with the invention. Another example of a suitable material is so-called SAPO (silicon, aluminum, phosphorus and oxygen).

With reference to FIG. 2, it can be noted that the invention provides that reduction agent is fed from the inlet of the separation unit 22 (not apparent from FIG. 2) and along one of the sides of the respective wall 32, while exhaust gases are fed from the exhaust pipe 21 and along the other side of the corresponding wall 32. In this case, the walls 32 constitute a membrane structure that, by means of its material properties, is adapted to allow passage of gas components in the exhaust gas flow with a high rate of diffusion in the direction of the ducts 33a where the reduction agent is guided. In a corresponding manner, the walls 32 allow passage of reduction agent with a high rate of diffusion in the direction of the ducts 33b where the exhaust gas flow is guided. On the other hand, a considerably restricted diffusion of oxygen from the exhaust gas flow and through the respective wall 32 occurs, which corresponds to a comparatively low rate of diffusion for oxygen. This delay of the passage of the oxygen through the respective wall is in turn provided by means of the fact that the walls 32 consist of the zeolite material, wherein the gas transport from the duct 33a with the reduction agent as well as the duct 33b with the exhaust gas flow is forced to go through the pore structure of the zeolite. According to the invention, the diffusion capacity can be affected considerably by means of the fact that the polarity of the wall structure 32 is modified in order to provide a slow transport speed for non-polar gas components such as $N_2$ and $O_2$, while polar gas components are provided with a high transport speed. For example, the polarity can be affected by exchanging aluminum (Al) for silicon (Si) in the structure of the zeolite. Silicon is quadrivalent and aluminum is trivalent. In this case, silicon needs a counter-ion, for example $Na^+$ or $H^+$. Alternatively, the counter-ion can be constituted by silver ($Ag^+$). Moreover, the relation Si/Al in the zeolite can be varied. Furthermore, a zeolite with small pores is suitably used, with a pore structure where the pores are approximately five angstrom or smaller.

Thus, the membrane structure that is defined by the walls 32 provides an improved selectivity for the reaction between the $NO_x$ compounds and the reduction agent compared with the competing reaction between oxygen and the reduction agent. In this manner, an advantage is attained in so far as the reduction agent is not wasted unnecessarily by reacting with oxygen molecules in the exhaust gas flow.

Figure 3:
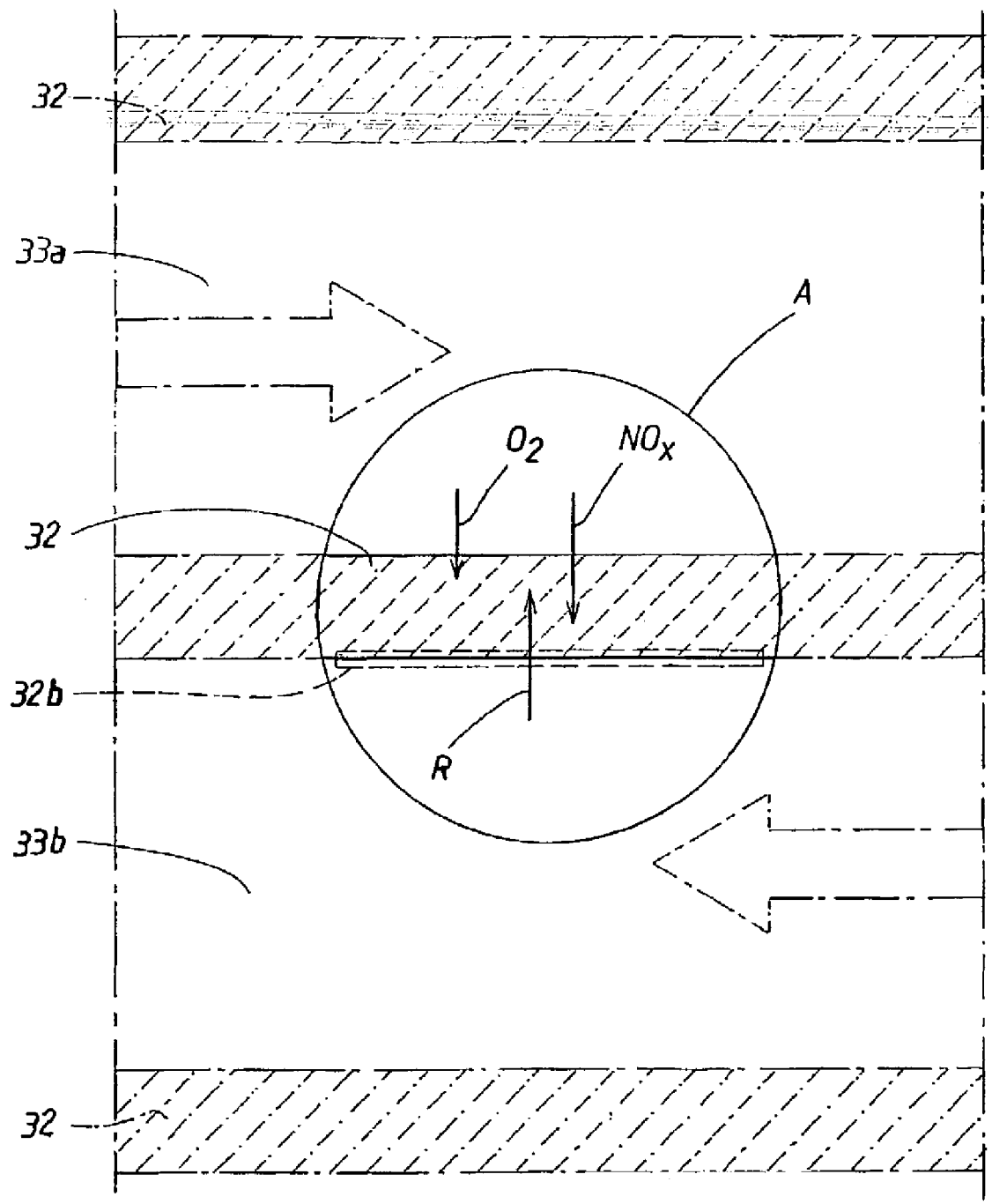
FIG. 3 is an additionally enlarged detail view of a part of the separation unit according to the invention.

The reactions that take place in the wall structure 32 are indicated in greater detail in FIG. 3, which is an additionally enlarged view of the detail section A which is indicated in FIG. 2. Accordingly, in FIG. 3, the reduction of $NO_x$ compounds in the respective wall 32 is shown in a diagrammatical manner. A basic principle of the invention is that the walls 32 also serve as a catalyst for the reaction between $NO_x$ compounds in the exhaust gas flow and the reduction agent. In this case, the catalytic reaction essentially takes place in connection with the surface layer of the respective wall 32, i.e. in the surface layer of the respective wall 32 that is directed inwards to the corresponding duct 33b for reduction agent. The surface layer is indicated in FIG. 3 with the reference numeral 32b. The $NO_x$ compounds that are guided through the respective wall 32 will be adsorbed on the surface layer 32b, as well as the reduction agent that is guided along the respective duct 33b. Due to the fact that the material is selected in the above-mentioned manner so that oxygen in the respective exhaust gas duct 33a has a low transport speed through the wall 32, a selective penetration of $NO_x$ compounds before (e.g.) oxygen takes place. In this manner, oxygen will not take part in the reaction in the surface layer 32b. Due to the fact that the reduction agent also has a low transport speed through the wall 32, it will diffuse inwardly a very short distance 32 and react with the $NO_x$ compounds in the surface layer 32b. The reaction that is utilized in the membrane follows the relationship:

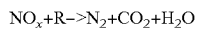

where R is the reduction agent in question, which e.g. is constituted by HC compounds in the engine's 1 fuel. Other examples of suitable reduction agents are hydrogen gas ($H_2$), carbon monoxide (CO) and ammonia ($NH_3$). Thus, it can be established that the $NO_x$ compounds react with the reduction agent and form harmless molecular nitrogen, carbon dioxide and water.

As an alternative to that which has been described above in which a catalytic reaction occurs in the surface layer of a wall structure with a catalytic function, the catalytic function can be provided by means of a separate catalyst coating which is placed on the wall structure. Accordingly, in this alternative solution, a separate surface layer can be utilized for this function.

With reference once again to FIG. 1, it is shown that any possible remaining reduction agent, i.e. reduction agent which has not reacted with any gas component in the exhaust gas flow, is guided back to the intake side of the engine via the conduit 31. It is transported by means of the negative pressure that prevails in the inlet 2 in relation to what prevails in the separation unit 22. This process is facilitated if the above-mentioned carrier gas conduit 28b is utilized. Alternatively, a pump device can be used in order to suck the reduction agent through and then feed it in into the engine's cylinders, together with the remaining air and fuel.

According to one possible solution, the remaining reduction agent can also be guided out directly into the atmosphere, for example, without being returned to the engine 1.

The control unit 5 can be utilized for a control of the amount of reduction agent which is fed to the separation unit 22 by means of the signal from the $NO_x$ sensor 25 or by supplying the control unit 5 with stored tables which describe how the prevailing operating condition as regards the engine's 1 relevant load, engine speed and temperature produces $NO_x$ compounds. In this latter case, no separate $NO_x$ sensor is required.

Furthermore, the control unit 5 is suitably adapted for calculation of how affective the $NO_x$ reduction is in connection with a particular flow of reduction agent, suitably by utilizing the $NO_x$ sensor 25 in order to detect the amount of $NO_x$ compounds in the exhaust gas flow after the separation unit 22, for the respective flow of reduction agent. Suitably, the amount of supplied reduction agent can in this case be adjusted to the prevailing $NO_x$ reduction. Accordingly, by utilizing the control unit 5 for a continuous detection of the concentration of $NO_x$ compounds in the exhaust gases, a possibility to adjust the amount of supplied reduction agent is provided.

Furthermore, by means of the $NO_x$ sensor 25, a possibility to diagnose the function regarding the $NO_x$ reduction is provided. In this case, this takes place by utilizing the control unit 5 for measuring the relevant concentration of $NO_x$ compounds and for comparing certain predetermined limit values during various operating conditions of the engine 1. In those cases where the limit values are not fulfilled, it can be established that there is some kind of error as regards one of the integral components. In such a case, the control unit 5 can also be utilized in order to generate some form of indication; for example, in the form of a warning lamp that warns the vehicle's driver that the $NO_x$ reduction is not functioning normally.

Calculations have shown that an exemplary engine 1 with essentially continuous lean operation provides a decrease of the fuel consumption with approximately 10-15 in relation to conventional petrol engines. From this profit in fuel consumption, approximately one percentage unit disappears which is required for providing the above-mentioned reduction agent. Thus, a clear profit of 9-14 in fuel consumption is provided in relation to previously known engine arrangements. Furthermore, it has been established that in the case when the invention is utilized in connection with a diesel engine, a fuel saving is provided which is approximately 30 lower than what is the case as regards conventional petrol engines.

It should be appreciated that the invention is particularly suitable to be utilized in diesel engines, which is due to the fact that the temperature of the exhaust gases from a diesel engine normally is lower that the exhaust gas temperature in a petrol engine and that the method according to the invention for reduction of $NO_x$ compounds has proven to be particularly effective during comparatively low exhaust gas temperatures.

In the following, a second embodiment of the invention is described with reference to the FIG. 4, which essentially corresponds to FIG. 1, but that does not include any supply of a reduction agent. Moreover, it can be noted that the same reference numerals are used in FIG. 4 for the components that also are apparent from FIG. 1.

Figure 4:
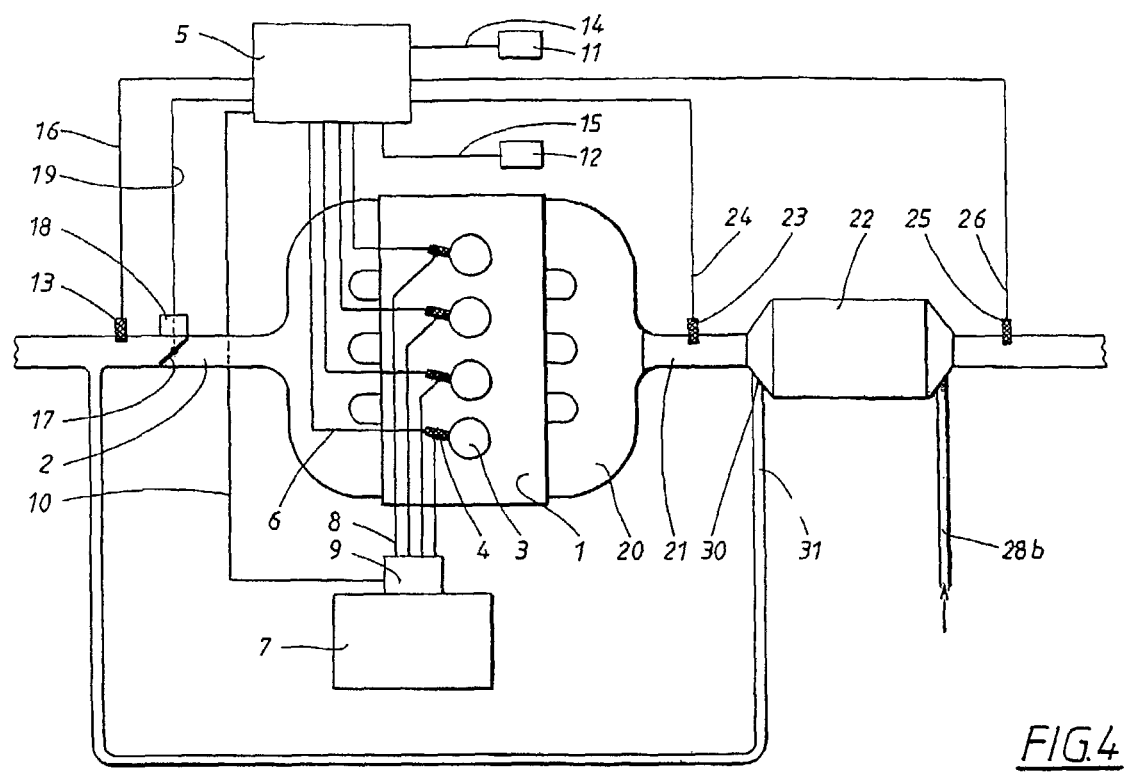
FIG. 4 is principal diagram which essentially corresponds to FIG. 1, but which shows an arrangement according to a second embodiment of the invention.

According to what is apparent from FIG. 4, the separation unit 22 is connected with the inlet 2 of the engine 1 in a manner that corresponds to the above-mentioned embodiment; for example, via a conduit 31. Unlike the embodiment according to FIG. 1, however, in which the conduit 31 is utilized for return of any possible unutilized reduction agent to the engine 1, the conduit 31 in the embodiment according to FIG. 4 is utilized for return of $NO_x$ compounds that have been separated from the engine exhaust gases by means of the separation unit 22. In this case, the separation of $NO_x$ compounds takes place in a manner that corresponds to what has been explained above with reference to FIGS. 2 and 3, in so far as the separation unit 22 includes a wall structure of a material that provides a selective passage of $NO_x$ compounds before other gas components in the exhaust gases. Accordingly, in the embodiment according to FIG. 4, no reduction agent is supplied, but $NO_x$ compounds in the exhaust gases will be separated from the exhaust gases in the separation unit 22 and be returned to the engine 1 via the conduit 31 instead of being released out into the surrounding atmosphere.

Furthermore, a conduit 28b is preferably utilized as a carrier for the gas, preferably air from the surrounding atmosphere, which in this case is fed into the separation unit 22. The carrier gas will in this case guide the $NO_x$ compounds that have been separated by the separation unit 22 back to the engine 1, via the return conduit 31.

According to a third embodiment of the invention, an arrangement is utilized which essentially corresponds to what is shown in FIG. 4. Nor in this third embodiment is any supply of reduction agent utilized. Furthermore, the separation unit according to this third embodiment is provided with a wall structure of a material that provides a selective passage of water in the exhaust gases that flow out from the engine and through the separation unit 22. To this end, the material in the wall structure may suitably be constituted by ZSM-5, but other materials are also possible.

It is known that a supply of water provided to a combustion engine decreases the generation of $NO_x$ compounds in the engine. This principle is utilized in the third embodiment in so far as a certain amount of water is separated from the exhaust gas flow in the separation unit and is subsequently returned to the air inlet 2 of the engine 1, via a return conduit 31 that is intended for return of water.

Figure 5:
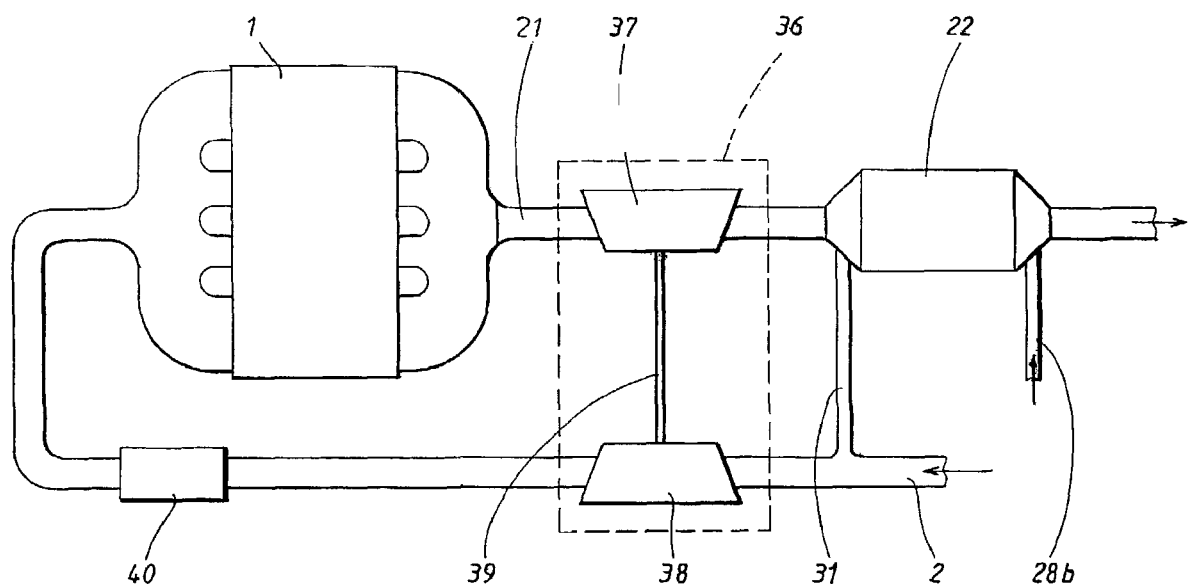
FIG. 5 shows an arrangement according to a fourth embodiment of the invention.

A fourth embodiment of the invention is shown in FIG. 5. FIG. 5 is a slightly simplified principal diagram of an engine system which essentially corresponds to what has been described above, but which is intended for an engine 1 which is provided with a turbo-aggregate 36, which in turn includes an exhaust gas operated turbine 37 and a compressor 38 by means of which inflowing air is compressed. To this end, the turbine 37 and the compressor 38 are arranged on a common axle 39 in a known manner, wherein the compressor 38 is operated by the turbine 37 that is in turn operated by the exhaust gases that flow from the engine 1. Moreover, the system includes a so-called "intercooler" 40, by means of which the air, which has been fed through the compressor 38 and to the engine 1, can be cooled.

According to what is apparent from FIG. 5, the engine 1, via its exhaust pipe 21, is connected with a separation unit 22 of the corresponding type that has been described above. The exhaust gases from the engine 1 are fed through the exhaust gas turbine 37 and further through the separation unit 22. In a manner which has been described above, the separation unit 22 is adapted to separate a certain exhaust gas component in this case water from the flowing exhaust gases. According to the embodiment, this return of water takes place to a point upstream of the compressor 38 of the turbo-aggregate 36, via a conduit 31 that connects the separation unit 22 with the inlet 2 of the engine 1. In this manner, water can be separated from the exhaust gases and be returned to the intake side of the engine 1. This is conducive to decreasing the amount of $NO_x$ compounds that are formed in the engine. Alternatively, the return of water can also take place to a point downstream of the compressor 38.

Accordingly, in contrast to conventional EGR systems, a "selective EGR function" is provided via one embodiment of the invention in which no extra water needs to be added. Instead, the amount of water that is present in the exhaust gases is utilized.

The water that is returned from the exhaust gas flow can either be gaseous or liquid. In the latter case, an improved function is provided by means of the above-mentioned cooling device 40, which in this case is utilized for cooling the water that is then returned to the engine 1. It can be established that the generation of $NO_x$ compounds in the engine 1 in principle decreases, the larger the amount of water is which is returned to the inlet 2. In can in particular be established that after saturation of the water, a decrease of the $NO_x$ generation is provided which is higher in proportion to the case where there is no saturation.

Figure 6:
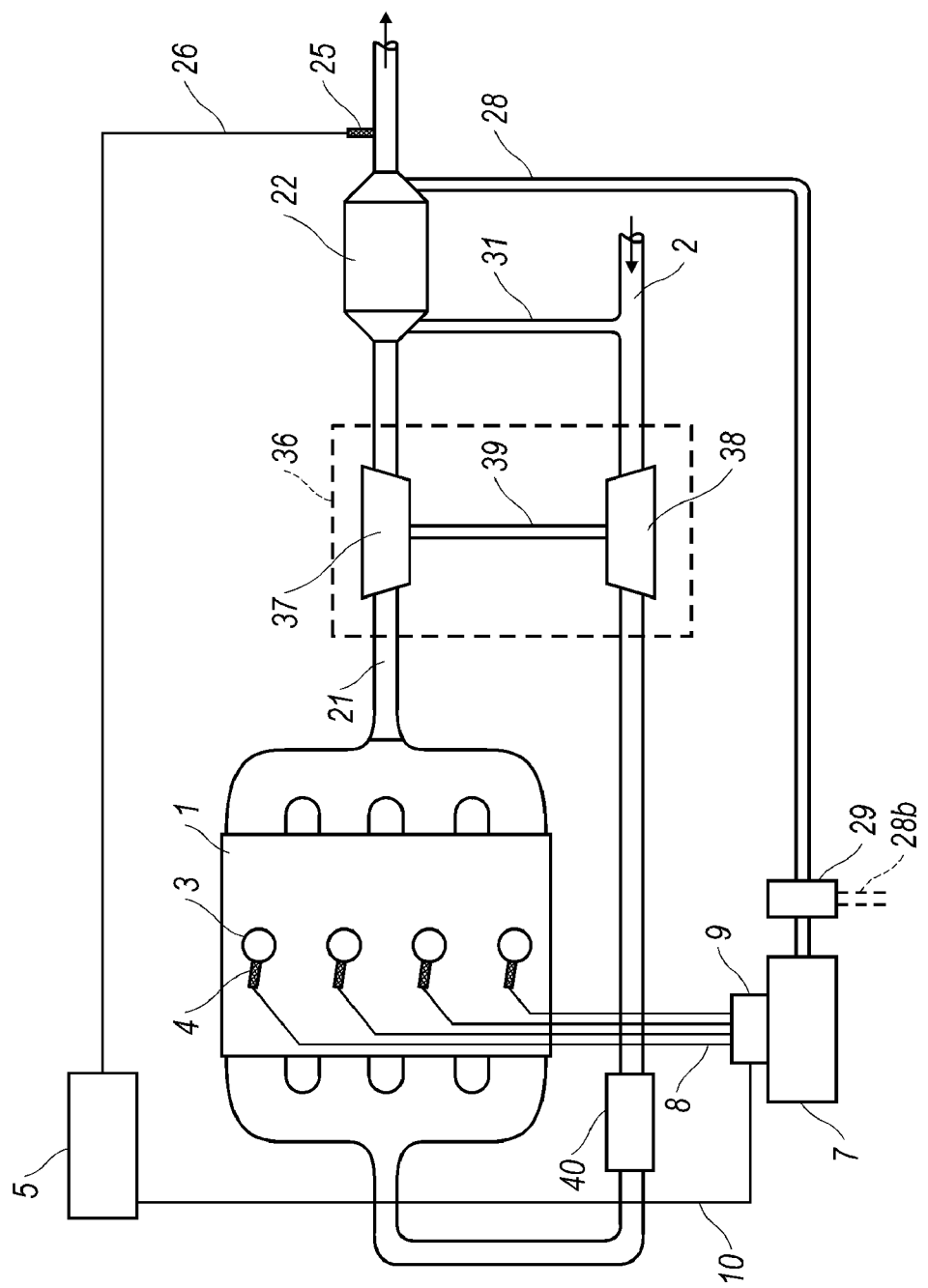
FIG. 6 shows an arrangement according to a fifth embodiment of the invention.

A fifth embodiment of the invention is shown in FIG. 6. FIG. 6 is a slightly simplified principal diagram of an engine system which essentially corresponds to what has been described above, but which is intended for an engine 1 which is provided with a turbo-aggregate 36, which in turn includes an exhaust gas operated turbine 37 and a compressor 38 by means of which inflowing air is compressed. To this end, the turbine 37 and the compressor 38 are arranged on a common axle 39 in a known manner, wherein the compressor 38 is operated by the turbine 37 that is in turn operated by the exhaust gases that flow from the engine 1. Moreover, the system includes a so-called "intercooler" 40, by means of which the air, which has been fed through the compressor 38 and to the engine 1, can be cooled.

According to what is apparent from FIG. 6, the engine 1, via its exhaust pipe 21, is connected with a separation unit 22 of the type as described with respect to FIG. 1. The exhaust gases from the engine 1 are fed through the exhaust gas turbine 37 and further through the separation unit 22. In a manner which has been described above the separation unit 22 is adapted to separate a certain exhaust gas component, in this case $NO_x$. According to this embodiment, a reduction agent is supplied separately from the exhaust gas flow that is emitted from the engine 1. More precisely, the reduction agent is taken from the vehicle's own fuel. To this end, conduit 28 is adapted for feeding fuel from fuel tank 7 to separation unit 22. Furthermore, along the conduit 28, a special transformation unit 29, described above, is provided which is adapted for treatment of the fuel, which is fed via the conduit 28 into a form that is suitable as a reduction agent in the separation unit 22. In one embodiment, a connection to the surrounding atmosphere is provided for supplying a carrier gas to the transformation unit as shown in reference numeral 28b.

A conduit 31 is also provided for returning exhaust gases to the engine. In one embodiment, un-reduced $NO_x$ is returned to the engine via conduit 31. In another embodiment, the reducing agent that has not reacted with the exhausted gases is returned to the engine. In another embodiment, a combination of exhaust gases and unused reducing agent is returned through conduit 31 to the engine.

Conduit 31 connects the separation unit 22 with inlet 2 of the engine. In this manner any one of the exhaust gases described above can be returned to the intake side of the engine 1. This is conducive to decreasing the amount of $NO_x$ compounds that are formed in the engine.

The invention is not limited to the embodiments which are described above and shown in the drawings, but may be varied within the scope of the appended claims. For example, the invention can be utilized in both petrol and diesel engines, or in other applications where a reduction of $NO_x$ compounds is desirable in an engine that is operated by a surplus of oxygen in the exhaust gases. In principle, the invention(s) can also be applied in other connections where a reduction of a certain gas component in a gas flow, such as carbon monoxide—CO, is desirable.

By means of the invention, a $NO_x$ adsorbent of conventional type can be replaced, which results in advantages, not least since it no longer becomes necessary with a periodically rich operation (for regeneration of the $NO_x$ adsorbent).

According to an alternative of the embodiments that have been described above with reference to FIG. 4, the invention can be utilized for a combined return of $NO_x$ compounds, as well as water to the inlet of the engine. This can be provided by utilizing a separation unit with a wall structure of essentially the same type that has been described above, but which is designed in such manner that a selective passage of both $NO_x$ compounds and water is provided. This can be realized by means of suitably selected material properties in the wall structure, for example, as regards its material and pore size. For example, a material of the ZSM-5 type with different pore sizes in different walls can be utilized for this simultaneous selective separation of $NO_x$ compounds and water. In this case, by means of such a separation and subsequent return of $NO_x$ compounds and water to the engine's inlet, a decrease of the generation of $NO_x$ compounds in the engine is provided.

Furthermore, the separation unit 22 according to the invention can be combined with a separate three-way catalyst. Alternatively, the separation unit 22 can be combined with, for example, a particle filter, an oxidation catalyst or a urea based after-treatment unit.

Furthermore, the invention can be supplemented with a compressor device, which can be exemplarily situated along the carrier gas conduit 28b (FIGS. 1 and 4) in order to increase the pressure of the carrier gas that is utilized for return of the separated exhaust gas component. This can be suitable for adjusting the invention to utilization in various engine types.

Moreover, the invention can be supplemented with some form of regulating device for the supplied carrier gas. This can, for example, be realized by utilizing a regulating valve that in this case can be situated along the carrier gas conduit 28b. In this type of arrangement, such a valve is suitably electrically connected to and controllable by means of the control unit 5 as exemplarily illustrated in FIGS. 1 and 4.

The invention claimed is:

1. A method of reducing an amount of oxide of nitrogen ($NO_x$ compound) in an exhaust gas flow of a combustion engine which is adapted for operation by a lean air/fuel mixture, said method comprising steps of:
    feeding the exhaust gas flow from the engine into an exhaust gas operated turbine of a turbo-aggregate;
    separating in the separation unit a gas component from the exhaust gas flow, said gas component being constituted by an oxide of nitrogen ($NO_x$ compound) or water present in the exhaust gas flow, in a wall structure comprising a porous material which provides a selective passage of the gas component through the wall structure before other gas components in the exhaust gas flow based on molecular size and molecular form;
    returning the separated gas component to an inlet of the engine via a conduit and compressing the separated gas component from the conduit in a compressor of the turbo-aggregate, said gas component including fresh air as a carrier gas for the gas component;
    detecting an amount of the oxide of nitrogen ($NO_x$ compound) in the exhaust gas flow for controlling the amount of the oxide of nitrogen ($NO_x$ compound) present in the exhaust gas flow, and
    wherein the method includes an additional step of supplying a reducing agent to an inlet of the separation unit for a catalytic reduction of the gas component in the wall structure by the reducing agent.

2. A method as claimed in claim 1, wherein the method further comprises a step of diagnosing a function regarding reduction of the oxide of nitrogen.

3. A method as claimed in claim 1, further comprising supplying the reducing agent from a tank forming a part of the engine and being intended for a regular fuel of the engine, and wherein the reducing agent is taken from the fuel.

4. A method as claimed in claim 3, including a step of feeding the reducing agent through the separation unit in essentially a counter-current flow in relation the exhaust gas flow.

5. A method as claimed in claim 4, including steps of:
    feeding back a portion of the reducing agent which has not reacted with the gas component from the separation unit; and
    returning the portion of the reducing agent to the inlet of the engine.

6. A method as claimed in claim 5, wherein the step of feeding back a portion of the reducing agent which has not reacted with the gas component from the separation unit includes feeding in fresh air as a carrier gas for the reducing agent.

7. A method as claimed in claim 6, including a step of supplying the reducing gas to the separation unit essentially continuously during lean operation of the engine.

8. A device for reducing an amount of oxide of nitrogen ($NO_x$ compound) in an exhaust gas flow of a combustion engine which is adapted for operation by a lean air/fuel mixture, said device including:
    a separation unit operable to be fed an exhaust gas flow from the engine, said separation unit comprising a wall structure for separating the gas component from the exhaust gas flow, said gas component being constituted by an oxide of nitrogen ($NO_x$ compound) or water present in the exhaust gas flow, said wall structure comprising a porous material which provides a selective passage of the gas component through the wall structure before other gas components in the exhaust gas flow based on molecular size and molecular form;
    a conduit for returning the separated gas component to an inlet of the engine, said gas component including fresh air as a carrier gas for the gas component; and
    a detector for detecting an amount of the oxide of nitrogen ($NO_x$ compound) in the exhaust gas flow for controlling the amount of the oxide of nitrogen ($NO_x$ compound) present in the exhaust gas flow,
    wherein the combustion engine includes a turbo-aggregate comprising an exhaust gas operated turbine and a compressor for compressing air for feeding into the engine, characterized in that the conduit is connected upstream of the compressor, said device being operable to supply a reducing agent to an inlet of the separation unit for resulting in a catalytic reduction of the gas component in the wall structure by using the reducing agent.

9. A device as claimed in claim 8, said device being operable to diagnose a function regarding reduction of the oxide of nitrogen.

10. A device as claimed in claim 8, wherein the reducing agent is supplied from a tank forming a part of the engine and being intended for a regular fuel of the engine, and wherein the reducing agent is taken from the fuel.

11. A device as claimed in claim 10, said device being operable to feed the reducing agent through the separation unit in an essentially counter-current flow in relation the exhaust gas flow.

12. A device as claimed in claim 11, wherein the conduit is configured to feed back a portion of the reducing agent which has not reacted with the gas component from the separation unit and return the portion of the reducing agent to the inlet of the engine.

13. A device as claimed in claim 12, having an inlet configured to supply fresh air as a carrier gas for the reducing agent.

14. A device as claimed in claim 13, said device being operable to supply the reducing gas to the separation unit essentially continuously during lean operation of the engine.

* * * * *